United States Patent [19]

Merani et al.

[11] 4,391,968
[45] Jul. 5, 1983

[54] PROCESS FOR PREPARING POLYAMIDES HAVING A MODIFIED DYE AFFINITY

[75] Inventors: Gianfranco Merani, Vercelli; Giuseppe Anzuino, Novara, both of Italy

[73] Assignee: Montedison S.p.A., Milan, Italy

[21] Appl. No.: 236,512

[22] Filed: Feb. 20, 1981

[30] Foreign Application Priority Data

Feb. 28, 1980 [IT] Italy .............................. 20229 A/80

[51] Int. Cl.$^3$ ........................ C08G 69/04; C08G 69/28
[52] U.S. Cl. .................................. 528/321; 528/313; 528/318; 528/336; 528/337
[58] Field of Search ............... 528/321, 337, 313, 336, 528/318

[56] References Cited

U.S. PATENT DOCUMENTS

| | | | |
|---|---|---|---|
| 3,039,990 | 6/1962 | Huffman | 528/321 |
| 3,142,662 | 7/1964 | Huffman | 528/313 |
| 3,184,436 | 5/1965 | Magat | 528/337 |
| 3,296,204 | 1/1967 | Caldwell | 528/337 |
| 3,389,549 | 6/1968 | David | 528/337 |
| 3,654,237 | 4/1972 | Kosel et al. | 528/313 |
| 3,682,866 | 8/1972 | Garforth | 528/337 |
| 3,755,255 | 8/1973 | Lodge | 528/337 |
| 3,950,311 | 4/1976 | Radlmann et al. | 528/321 |

*Primary Examiner*—Harold D. Anderson
*Attorney, Agent, or Firm*—Stevens, Davis, Miller & Mosher

[57] ABSTRACT

Polyamides having a modified dye affinity are disclosed as prepared by polymerizing polyamide-forming monomers with a mixture consisting or consisting essentially of a dicarboxylic acid having the general formula HOOC—R—COOH, in which R is an aromatic, cycloaliphatic or aliphatic radical, and of a salt of a sulphonic dicarboxylic acid having the general formula:

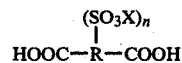

in which R has the meaning specified hereinbefore, X is an alkali or alkaline earth metal or ammonium, and n is a whole number from 1 to 4.

10 Claims, No Drawings

PROCESS FOR PREPARING POLYAMIDES HAVING A MODIFIED DYE AFFINITY

This invention relates to a process for preparing polyamides having a modified dye affinity.

More particularly, the present invention relates to a process for preparing polyamides particularly suited to be employed for producing fibers which cannot be dyed with both acid and basic dyes.

Modified polyamides obtained according to the process of the present invention provide fibers which, when blended with those obtained from unmodified polyamides, permit one to obtain after dyeing particular color effects on the finished article.

It is known from the literature that the affinity of the polyamides for acid dyes can be modified by introducing into the polymer chain a few units derived from a salt of an aromatic sulphonated dicarboxylic acid with a diamine. However, the presence of such sulphonated units in the polymeric chain permits one to reduce the affinity for the acid dyes, but imparts a dye affinity for the basic dyes.

According to a previously known technique, a polyamide not dyeable with the acid dyes can be obtained by preparing polymers having a high relative viscosity, for example from 2.8 to 3, and containing dicarboxylic acid end groups. However, the process for preparing such polyamides is rather complex and expensive since it is necessary to subject the polymer to a polymerization process carried out at reduced pressure.

It is an object of the present invention to provide a polyamide which cannot be dyed with both acid and basic dyes, prepared by any conventional polymerization process.

Anotheer object of the present invention is to provide a polyamide which cannot be dyed with both acid and basic dyes, and which exhibits a number of milliequivalents of amino groups/kg of polymer lower than 30 and a relative viscosity not higher than 2.8.

According to the present invention, these and still other objects are achieved by carrying out the polymerization of the polyamide-forming monomers in the presence of 1-45 millimols/kg of monomers, of a mixture consisting or consisting essentially of:

a dicarboxylic acid having the general formula:

$$\text{HOOC—R—COOH} \quad (I)$$

wherein R is a simple or substituted aromatic radical having 6 to 18 carbon atoms, a cyclo-aliphatic radical having 4 to 18 carbon atoms, or an alkylene radical having 1 to 12 carbon atoms, and a salt of a sulphonated dicarboxylic acid having the general formula:

(II)

wherein R has the meaning specified hereinbefore, X is an alkali or alkaline-earth metal or ammonium, and n is an interger from 1 to 4, and in which the molar ratio between the salt of the sulphonated dicarboxylic acid and the dicarboxylic acid, i.e. the molar ratio

ranges from 0.01 to 1.

The use of the particular combination of the two above-indicated compounds having the general formulas (I) and (II) in the process for preparing a polyamide allows one to both reduce the number of the polymer's free amino end groups, and to obtain a polymer (and hence corresponding shaped articles prepared therefrom) having a much lower dye affinity for acid dyes than that of the corresponding product containing the same number of free aminic groups.

In the present invention, the preferred dicarboxylic acids are those having general formula (I), in which R is an alkylene radical containing 4 to 10 carbon atoms, or an aromatic or cycloaliphatic radical containing 6 carbon atoms and having the carboxylic groups linked in ortho-, metal- or para-position.

The preferred salts having general formula (II) are the aromatic salts containing 6 carbon atoms, in which n is 1 and the carboxylic groups are linked in meta- or para-position. Examples of preferred salts having general formula (II) are: a salt of the iso-phthalic-5-sulphonated acid, a salt of the terephthalic-2-sulphonated acid, and the like. The salts of a sulphonated aliphatic dicarboxylic acid containing at least 4 carbon atoms, and in which n is 1, have also proved to be equally suitable.

The dicarboxylic acid having general formula (I) and the salt of the sulphonated dicarboxylic acid having general formula (II) are added to the polymerization medium at the beginning of polymerization in any amount provided that their sum does not exceed 45 millimols/kg of polyamide-forming monomers and the molar ratio between the salt of the sulphonated dicarboxylic acid and the dicarboxylic acid does not exceed 1.

The preferred amount of the mixture of the two components having general formulas (I) and (II) ranges from 20 to 35 millimols/kg of monomers. The preferred molar ratio between the sulphonated compound and the dicarboxylic acid ranges from 0.1 to 0.5.

As polyamide-forming monomers it is possible to use either the salts of an aliphatic dicarboxylic acid with an aliphatic diamine, such as hexamethylene-diammonium-adipate, or a lactam such as caprolactam.

The polyamides of the present invention, having a modified dye affinity, can be prepared according to various methods, such as, for example, by polymerizing, in the molten state and in an autoclave, a mixture of polyamide-forming monomers and the compounds having general formulas (I) and (II) specified hereinbefore. Such compounds can be fed separately or after preliminary mixing.

The polymer having a modified dye affinity and prepared by the process according to the present invention, has a relative viscosity of from 2.4 to 2.6 and is particularly suitable for being converted into fibers and filaments by the usual well-known spinning processes.

The properties of the obtained fibers or filaments are similar to those of the fibers or filaments obtained from the unmodified polymer, except that they cannot be dyed with both acid and basic dyes, under the normal dyeing conditions for polyamides.

Such fibers or filaments may be utilized as such or they may be blended with other filaments dyeable with acid dyes or with basic dyes for obtaining finished articles which, after dyeing, exhibit unusual color effects.

The following illustrative and non-limiting examples are given to provide a still more detailed understanding of the present invention and for further enabling those skilled in the art to practice the same.

In the following examples, unless otherwise specified, all the parts are in parts by weight.

EXAMPLE A (comparative test)

| Caprolactam | 3 kg | |
|---|---|---|
| distilled water | 139.3 g | |
| acetic acid | 5.4 g | (= 30 millimols/kg of caprolactam) | were introduced into a stainless steel 10 liter autoclave equipped with a stirrer and a thermometer.

The mixture was heated up to 260° C., and while keeping the temperature constant, it was subjected to a pressure of 4.5 atm. for 2 hours.

Thereupon, the reaction mass was brought over a period of two hours to atmospheric pressure by gradual venting, whereupon it was maintained for a further 3 hours in a nitrogen stream, always keeping the temperature at 260° C.

The autoclave was then pressurized with nitrogen and the polymer so obtained was extruded in the form of granules from the bottom of the autoclave, washed with water, and dried until a water content lower than 0.06% was attained.

On the polymer so obtained the following measurements were made: relative viscosity, at 20° C., by using a 1% solution in sulphuric acid at 96%; and the content of free amino groups, determined by potentiometrically titrating with 0.02 N perchloric acid the polymer dissolved in a mixture of phenol and methanol in a molar ratio of 1:1. The relative viscosity value and the content of free aminic groups are reported in the following table.

The polymer was melt spun according to a known technique and the filaments were cold stretched with a stretch ratio of 3.3. The filaments were dyed in an aqueous bath containing Alizarin Blue 4 GL at 100° C. and at a pH=5, employing bath/goods ratio of 40:1 and amount of dye/filament ratio equal to 0.7%. The dye affinity of the filaments is reported in the following table.

EXAMPLE B (comparative test)

Example A was repeated, using the following mixture as starting compounds:
caprolactam: 3 kg
distilled water: 139.3 g
terephthalic acid: 14.94 g (=30 millimols/Kg of caprolactam).

Viscosity and content of aminic end groups of the obtained polymer, as well as dye affinity of the corresponding filaments are reported in the following table.

EXAMPLES 1-6

It was operated exactly according to the operating conditions of example A, but substituting the acetic acid by an equal amount of a mixture of dicarboxylic acid and of a salt of a sulphonated dicarboxylic acid, in the ratio indicated in the table.

Viscosities and amounts of amino end groups of the polymers obtained, as well as dye affinity of the corresponding filaments are recorded in the following table.

TABLE

| | Added Compounds | Amount in millimols referred to caprolactam | Relative viscosity | Aminic end groups in m.eq./kg | Dye affinity |
|---|---|---|---|---|---|
| Example | Type | | | | |
| A | Acetic acid | 30 | 2.56 | 28.5 | dyes dark shades |
| B | Terephthalic acid | 30 | 2.56 | 20.0 | dyes light shades |
| 1 | Terephthalic acid | 25 | | | |
| | Lithium isophthalic 5-sulphonated acid | 5 | 2.59 | 19 | doesn't dye |
| 2 | Terephthalic acid | 15 | | | |
| | Lithium isophthalic 5-sulphonated acid | 15 | 2.54 | 19.1 | doesn't dye |
| 3 | Terephthalic acid | 20 | | | |
| | Lithium isophthalic 5-sulphonated acid | 10 | 2.56 | 20.5 | doesn't dye |
| 4 | Sebacic acid | 25 | | | |
| | Lithium isophthalic 5-sulphonated acid | 5 | 2.50 | 17.7 | doesn't dye |
| 5 | Sebacic acid | 20 | | | |
| | Lithium isophthalic 5-sulphonated acid | 10 | 2.50 | 18.1 | doesn't dye |
| 6 | Doedecandioic acid | 20 | | | |
| | Lithium isophthalic 5-sulphonated acid | 10 | 2.53 | 19.5 | doesn't dye |

What is claimed is:

1. A process for preparing a fiber-forming polyamide having a modified dye affinity and no affinity for acid dyes and no affinity for basic dyes, which comprises polymerizing a composition of at least one polyamide-forming monomer and 1–45 millimols/kg monomer of a modifier composition consisting essentially of a mixture of a dicarboxylic acid having the general formula

HOOC—R—COOH (I)

wherein R is a simple or simply substituted aromatic radical having 6 to 18 carbon atoms, cycloaliphatic radical having 4 to 18 carbon atoms, or an alkylene radical having 1 to 12 carbon atoums, and a salt of a sulphonated dicarboxylic acid having the general formula:

wherein R has the meaning specified hereinabove, X is an alkali or alkaline earth metal or ammonium radical, and n is an integer from 1 to 4, in which the molar ratio between the salt of the sulphonated dicarboxylic acid and the dicarboxylic acid,

ranges from 0.01 to 1.

2. A process according to claim 1, wherein the dicarboxylic acid has the general formula (I) in which R is an alkylene radical having 4 to 10 carbon atoms, or an aromatic or cycloaliphatic radical having 6 carbon atoms, and in which the carboxylic groups are linked in ortho-, meta- or para-position.

3. A process according to claim 1 or 2, wherein the salt of a sulphonated dicarboxylic acid has the general formula (II) in which R is an aromatic radical containing 6 carbon atoms, n is 1, and the carboxylic groups are linked in meta- or para-position.

4. A process according to claim 1 or 2 wherein the amount of mixture consisting essentially of a dicarboxylic acid having the general formula (I) and a salt of a sulphonated dicarboxylic acid having the general formula (II) ranges from 20 to 35 millimols/kg of monomers.

5. A process according to claim 1 or 2, wherein the molar ratio between the salt of a sulphonated dicarboxylic acid having the general formula (II) and the dicarboxylic acid having the general formula (I) ranges from 0.1 to 0.5.

6. A process according to claim 1 or 2, wherein the monomer forming the polyamide is the salt of a dicarboxylic aliphatic acid with a diamine.

7. A process according to claim 1 or 2, wherein the monomer forming the polyamide is a lactam.

8. A process according to claim 7, wherein the lactam is caprolactam.

9. Polyamide having no dye affinity for either acid or basic dyes, prepared according to the process claimed in claim 1 or 2.

10. A fiber or filament of a polyamide as defined in claim 9.

* * * * *